(12) United States Patent
Hagihara

(10) Patent No.: US 8,740,173 B2
(45) Date of Patent: Jun. 3, 2014

(54) BASE PLATE

(75) Inventor: Syunichirou Hagihara, Nobeoka (JP)

(73) Assignee: Asahi Organic Chemicals Industry Co., Ltd., Nobeoka-Shi, Miyazaki (JP)

( * ) Notice: Subject to any disclaimer, the term of this patent is extended or adjusted under 35 U.S.C. 154(b) by 168 days.

(21) Appl. No.: 13/243,281

(22) Filed: Sep. 23, 2011

(65) Prior Publication Data

US 2012/0080567 A1    Apr. 5, 2012

(30) Foreign Application Priority Data

Sep. 30, 2010  (JP) ................................ 2010-220790

(51) Int. Cl.
  *F16M 11/00*    (2006.01)
(52) U.S. Cl.
  USPC ........................... 248/680; 248/675; 248/500
(58) Field of Classification Search
  USPC ............ 248/673, 674, 675, 678, 680, 220.22, 248/500
  See application file for complete search history.

(56) References Cited

U.S. PATENT DOCUMENTS

| | | | |
|---|---|---|---|
| 670,763 A * | 3/1901 | Brodeur | 248/680 |
| 976,397 A * | 11/1910 | Roberts | 248/680 |
| 1,809,685 A * | 6/1931 | Foval | 248/680 |
| 3,321,165 A * | 5/1967 | Wann | 248/553 |
| 3,512,738 A * | 5/1970 | Galbarini et al. | 248/680 |
| 5,020,768 A * | 6/1991 | Hardt et al. | 248/678 |
| 5,126,607 A * | 6/1992 | Merriman, Jr. | 310/51 |
| 5,176,437 A * | 1/1993 | Remington | 312/351.1 |
| 5,692,722 A * | 12/1997 | Lundag.ang.rds | 248/553 |
| 5,779,060 A * | 7/1998 | Imamoto et al. | 211/26 |
| 5,971,349 A * | 10/1999 | Whittaker | 248/678 |
| 5,975,480 A * | 11/1999 | Schaefer et al. | 248/678 |
| 6,138,968 A * | 10/2000 | Svantesson et al. | 248/222.13 |
| 6,715,391 B2 * | 4/2004 | Wang | 83/471.3 |
| 6,740,851 B2 * | 5/2004 | Woodlief et al. | 219/421 |
| 6,874,756 B2 * | 4/2005 | Hawkins et al. | 251/291 |

(Continued)

FOREIGN PATENT DOCUMENTS

| | | |
|---|---|---|
| JP | 63-172827 U | 11/1988 |
| JP | 3-256281 A | 11/1991 |

(Continued)

*Primary Examiner* — Bradley Duckworth
(74) *Attorney, Agent, or Firm* — Buchanan Ingersoll & Rooney PC

(57) ABSTRACT

A base plate 1 for fixing an object 2 to an installation surface, comprising a plate-like base body 11 having a mounting portion 11a on its upper surface for mounting the object 2, and a fixing piece 12 having bolt-fastened portions 15 which are to be fastened onto the installation surface by means of fixing bolts. Portions to be fitted 13 are provided on side surfaces of the base body 11, a fitting portion 16 is provided at an end of the fixing piece 12 to detachably fit to the portion to be fitted 13, and the fixing piece 12 is detachably attached to the side surface of the base body 11. The base plate 1 has various uses, and also allows for easily fixing of the object even in a narrow and tight place.

9 Claims, 13 Drawing Sheets

(56) References Cited

U.S. PATENT DOCUMENTS

| | | | |
|---|---|---|---|
| 7,004,436 B2* | 2/2006 | Knapp | 248/220.22 |
| 8,020,821 B2* | 9/2011 | Chen et al. | 248/220.22 |
| 8,066,028 B2* | 11/2011 | Kees | 137/315.09 |
| 8,104,726 B2* | 1/2012 | Hoernig | 248/220.22 |
| 8,418,983 B2* | 4/2013 | Hartelius et al. | 248/500 |
| 2003/0209645 A1* | 11/2003 | DeGrazia et al. | 248/674 |
| 2004/0094688 A1* | 5/2004 | Michel et al. | 248/680 |
| 2005/0035265 A1* | 2/2005 | Dubensky et al. | 248/638 |
| 2010/0025179 A1* | 2/2010 | Behrens | 192/76 |
| 2010/0132810 A1* | 6/2010 | Pompian | 137/356 |

FOREIGN PATENT DOCUMENTS

| | | |
|---|---|---|
| JP | 5-38477 U | 5/1993 |
| JP | 9-280486 A | 10/1997 |
| JP | 10-288271 A | 10/1998 |
| JP | 2006-183730 A | 7/2006 |

* cited by examiner

RELATED ART

RELATED ART

BASE PLATE

BACKGROUND OF THE INVENTION

1. Field of the Invention

This invention relates to a base plate for fixing an object onto an installation surface. More specifically, the invention relates to a base plate for fixing a piping member used in pipelines in a chemical plant, a water and sewerage system, an agricultural or fisheries system, and other various manufacturing apparatuses.

2. Description of the Related Art

As a conventional fixing structure for fixing a piping member such as a valve onto an installation surface in pipelines, a structure for attaching the piping member to a fixing surface of a flow rate adjusting valve as shown in FIG. 14 has been known (e.g., see Japanese Unexampled Patent Publication JP-A-3-255281). According to the structure described in JP-A-3-255281, side surfaces 303 of casing bodies 302 of adjacent flow rate adjusting valves 301 are brought in contact together in order to couple a plurality of flow rate adjusting valves 301 together. The group of flow rate adjusting valves 301 is fixed on an installation surface by means of a bracket 308 having an L-shape cross section. The flow Late adjusting valve 301 has grooves 304 extending on both of the side surfaces 303 and onto an upper surface 305 of the casing body. A coupling rod 307 is fittingly inserted into an opening portion 306 formed at an end of the groove 304 on the upper surface 305 to couple the flow rate adjusting valves 301 to each other. The bracket 308 includes a longitudinal piece with the length substantially equal to the height of the casing body 302, and a transverse piece. While an engaging hook 309 provided at an upper end of the longitudinal piece is fittingly inserted into the opening portion 306, bolts are inserted through bolt holes 310 formed in the transverse piece to fix the bracket 308 onto the installation surface.

With the structure for attaching the piping member to the fixing portion of the flow rate adjusting valve described in JP-A-3-255281, however, in order to bring the bracket 308 into contact with the side surface of the flow rate adjusting valve 301, and to fittingly insert the engaging hook 309 of the bracket 308 into the opening portion 306 on the upper surface 305 of the casing body 302, the surface to which the bracket 308 of the flow rate adjusting valve 301 is attached must be a flat surface without ledge. For this purpose, the flow rate adjusting valve 301 must have an outer shape of a rectangular parallelepiped or cube without a ledge, thus limiting application of the bracket 308. Further, since the longitudinal piece of the bracket 308 covers the whole side surface of the flow rate adjusting valve 301, the bigger the flow rate adjusting valve 301 is, the bigger the bracket 308 must be. Therefore, the bracket 308 must be provided for the flow rate adjusting valve 301 of each size. Further, since the bracket 308 can be only attached to the limited side surface of the flow rate adjusting valve 301, when the flow rate adjusting valves 301 are being installed in a narrow place with many pipes or equipment, the transverse piece of the bracket 308 may pose a risk of interfering with obstacles near the installation place, thus limiting where the flow rate adjusting valves 301 can be installed.

The object of the present invention is to provide a base plate which can be applied to a wide range of objects, with greater applicability, allowing the object to be easily fixed even in a narrow and tight place.

SUMMARY OF THE INVENTION

The present invention is directed to a base plate for fixing an object onto an installation surface, comprising a plate-like base body having a mounting portion on an upper surface thereof for mounting the object, and a fixing piece having bolt-fastened portions which are to be fastened onto the installation surface by means of fixing bolts, the fixing piece being detachably attached to a side surface of the base body.

According to the present invention, the base plate is constituted by detachably attaching the fixing piece to the side surface of the base body, thereby allowing the base plate to be applied for fixing the object of any size and any shape, and for easily fixing the object even in a narrow and tight place.

These and other objects, features and advantages of the present invention will become more apparent in light of the detailed description of exemplary embodiments thereof as illustrated by the drawings.

DETAILED DESCRIPTION

The present invention will now be described by way of embodiments; however, the invention is in no way limited thereto.

First Embodiment

A first embodiment of the invention will now be described with reference to FIGS. 1 to 6. The first embodiment will be explained by way of an example in which a constant pressure valve is fixed onto an installation surface by means of a base plate which constitutes a part of the constant pressure valve.

Figure 1:
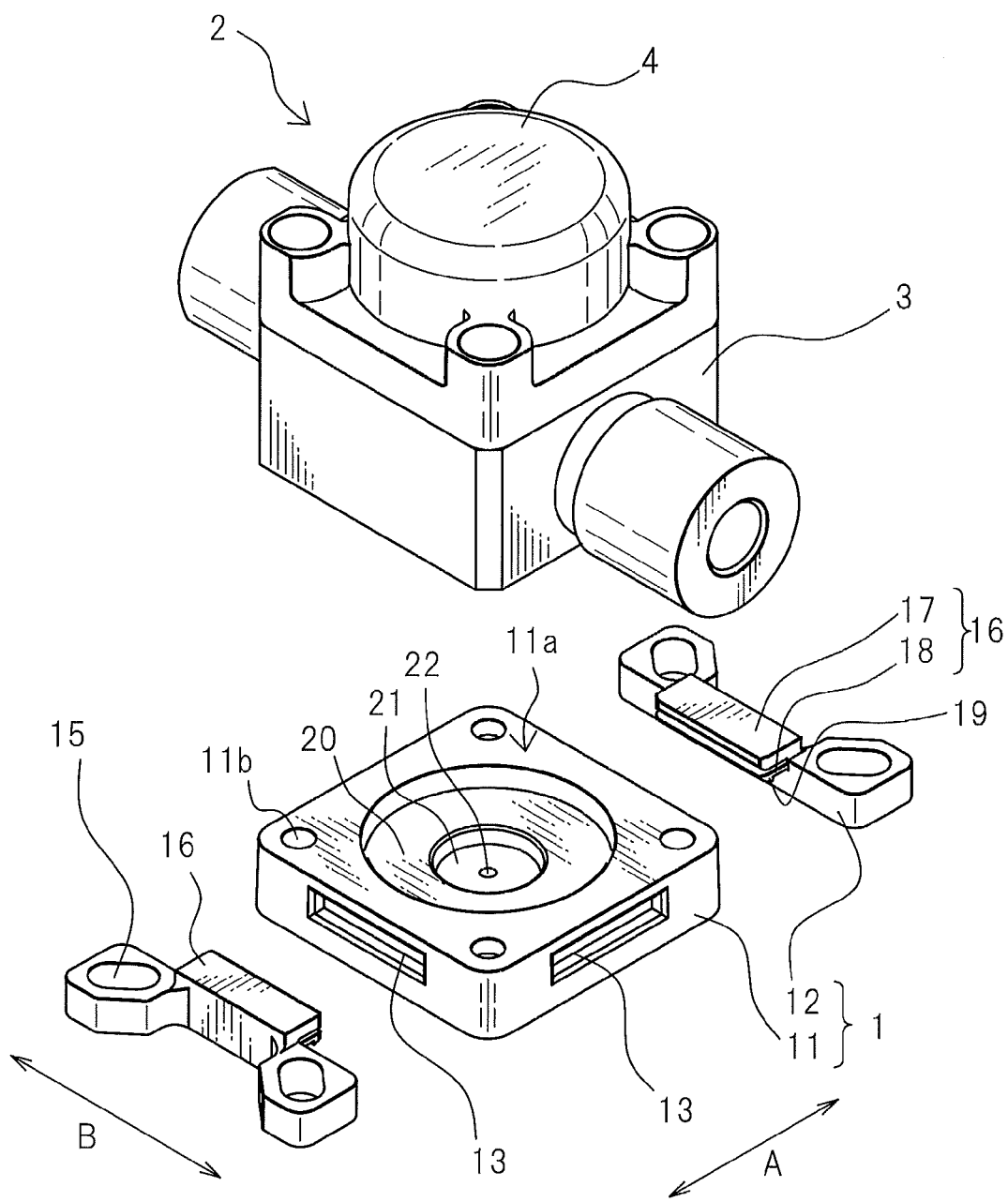
FIG. 1 is an exploded perspective view of a constant pressure valve to which a base plate according to a first embodiment of the invention is applied.
Figure 2:
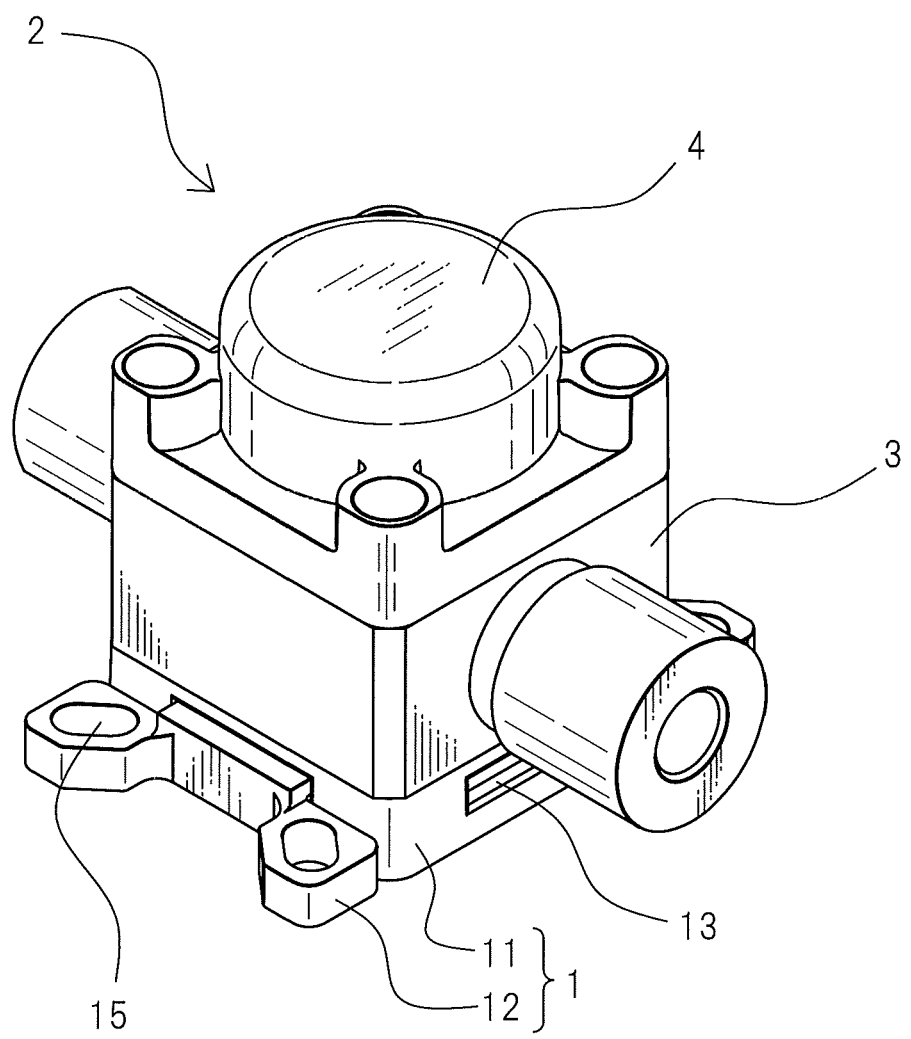
FIG. 2 is a perspective view illustrating the constant pressure valve of FIG. 1 in an assembled state.
Figure 3:
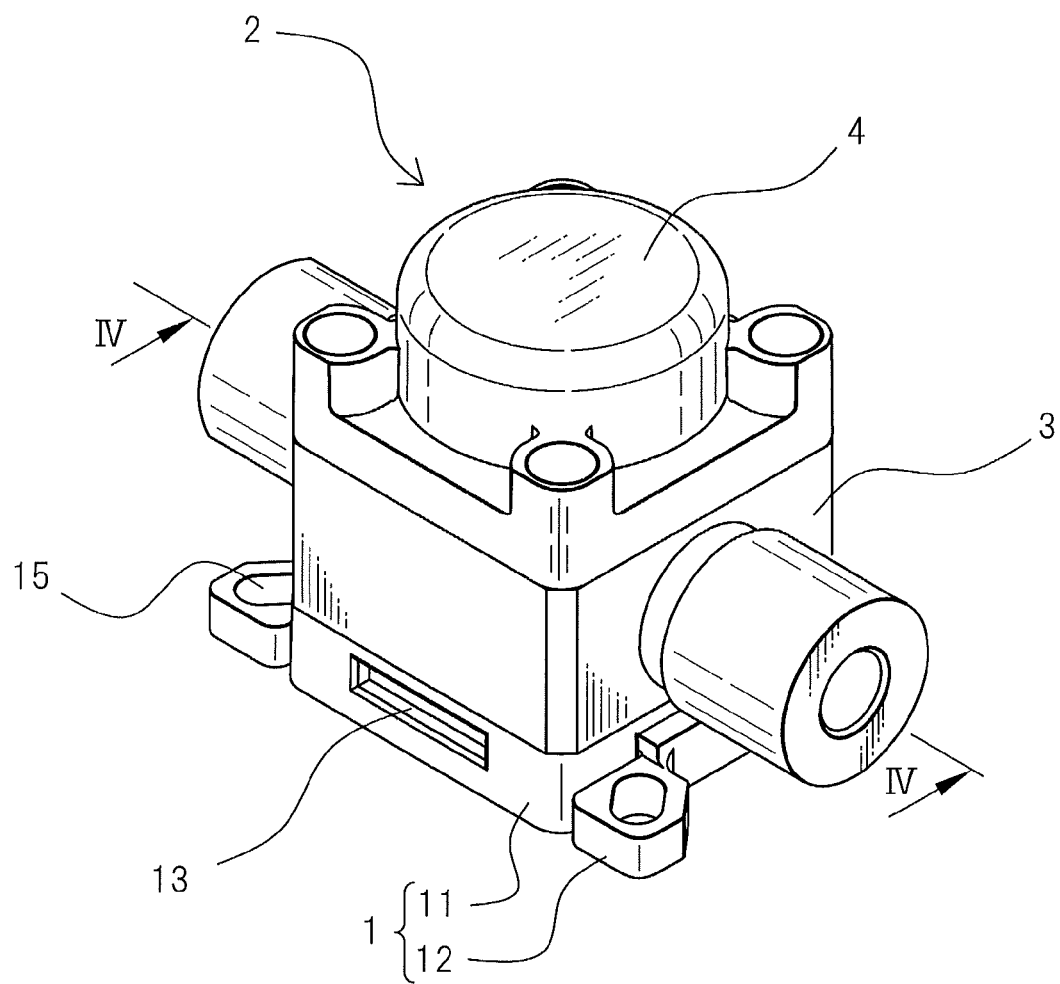
FIG. 3 is a perspective view illustrating the constant pressure valve of FIG. 1 in an assembled state different from FIG. 2.
Figure 4:
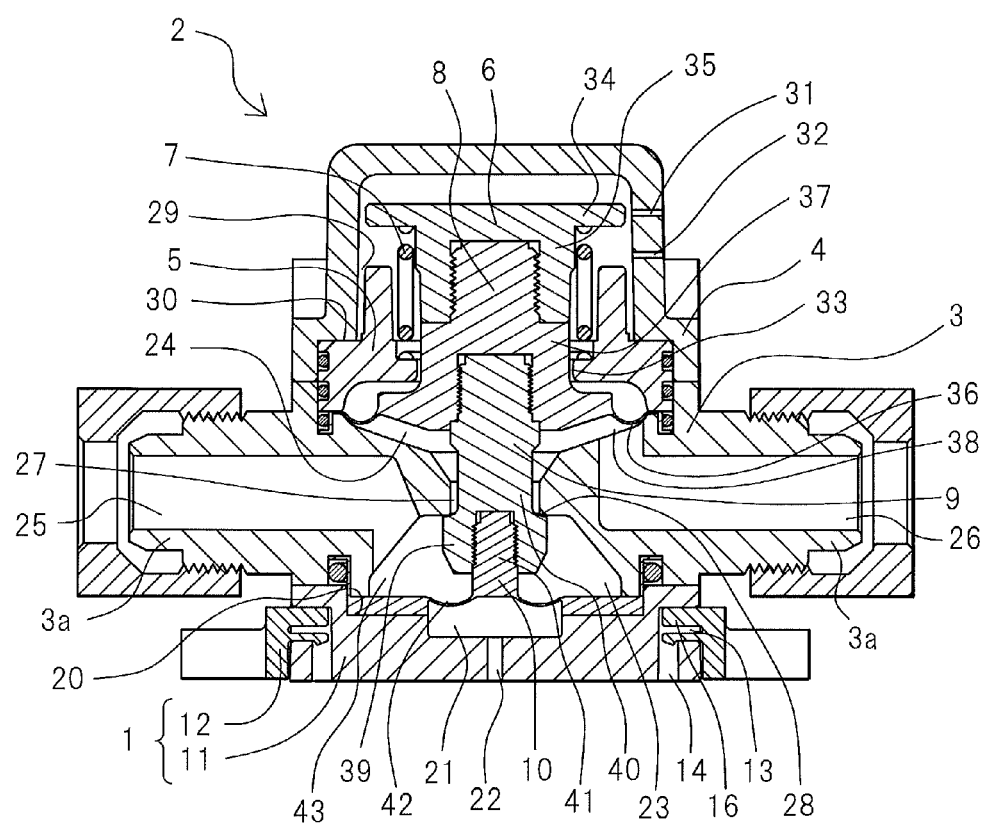
FIG. 4 is a sectional view along the line IV-IV in FIG. 3.

FIG. 1 is an exploded perspective view of the constant pressure valve to which the base plate according to the first embodiment of the invention is applied. FIGS. 2 and 3 are perspective views illustrating the constant pressure valve in an assembled state, and FIG. 4 is a sectional view along the line IV-IV in FIG. 3. The constant pressure valve 2 includes the base plate 1, a main body 3 mounted on an upper surface of the base plate 1, and a bonnet 4 mounted on an upper surface of the main body 3.

The base plate 1 is made of, for example a polyvinylidene fluoride (hereinafter referred to as "PVDF"). As shown in FIG. 1, the base plate 1 includes a plate-like base body 11 of a substantially square shape in a plan view, and a pair of fixing pieces 12 detachably attached to side surfaces of the base body 11. The base body 11 has on its upper surface a mounting portion 11a for mounting the main body 3. The fixing piece 12 has at both end portions thereof a pair of bolt-fastened portions 15, and through which fixing bolts are to penetrate, and a protruded portion 16 formed at a central portion of the fixing piece 12. The bolt-fastened portions 15 and the protruded portion 16 are formed in a protruding manner from the opposite sides of the fixing piece 12 in the horizontal direction, respectively.

The base body 11 has a substantially rectangular shape in a plan view, corresponding to the shape of the main body 3, and is provided with an elongated recessed portion 13 on each side surface of the base body 11 in the widthwise direction of the base body 11. The direction A and the direction B in FIG. 1 are referred to as "widthwise directions," respectively. As shown in FIG. 4, on a bottom surface of the base body 11, elongated groove portions 14 are formed in the widthwise direction and the lengthwise direction, corresponding to the recessed portions 13. The groove portions 14 and the recessed portions 13 are in communication with each other at their inner portions, so as to form opening portions of a substantially L-shape in cross section which extends from the side surfaces at the side ends to the bottom surface of the base body 11. The groove portions 14 may be formed in the whole bottom surface of the base body 11 or may be formed as a result of thinner walls to avoid sink marks during an injection molding of the base body 11.

The protruded portion 16 of the fixing piece 12 has an insertion plate 17 formed in a protruding manner in the horizontal direction above an upper end surface of the bolt-fastened portions 15, and a leaf spring 18 formed in a protruding manner in the horizontal direction under the insertion plate 17 and spaced apart from the insertion plate 17. The insertion plate 17 has a substantially rectangular parallelepiped shape, and its upper surface and bottom surface are flat. The leaf spring 18 has a flat upper surface and has, at its distal end on the bottom surface, a projection 19 that extends downward and has a tapered tip portion. The protruding length of the leaf spring 18 is substantially equal to the protruding length of the insertion plate 17, and the width of the leaf spring 18 is substantially equal to the width of the insertion plate 17. The leaf spring 18 has a decreased thickness at the proximal end thereof and is resiliently deformable in the upward and downward directions with the proximal end as a fulcrum.

Figure 5A:
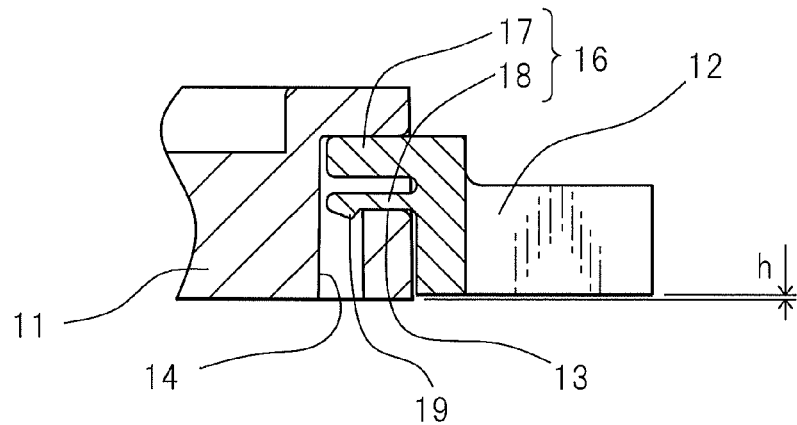
FIG. 5a is a sectional view of a major portion illustrating a process of disassembling the base plate according to the first embodiment of the invention.

To attach the fixing piece 12 to the base body 11, the protruded portion 16 of the fixing piece 12 is pushed into the recessed portion 13 of the base body 11 in the lateral direction. In this process, the projection 19 at the distal end of the leaf spring 18 is raised by a bottom surface of the recessed portion 13, and the distal end of the leaf spring 18 is resiliently deformed toward the insertion plate 17. As the protruded portion 16 is pushed into the recessed portion 13 to a maximum degree, the projection 19 passes beyond the recessed portion 13 and, as shown in FIG. 5a, comes into engagement with the groove portion 14 with the aid of biasing force by the leaf spring 18. In this manner the protruded portion 16 is fitted with the recessed portion 13. Here, since the projection 19 engages with the groove portion 14, a place where the projection 19 engages can be provided within the base body 11 without forming undercut. Therefore, the base body 11 can be molded only by the injection molding, requiring no post-process.

Figure 5B:
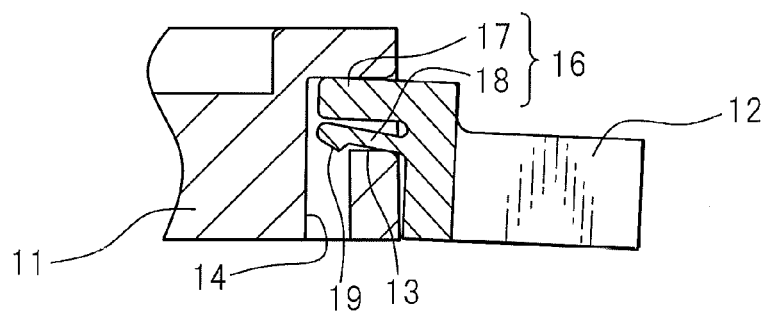
FIG. 5b is a sectional view of a major portion illustrating a process of disassembling the base plate according to the first embodiment of the invention.
Figure 5C:
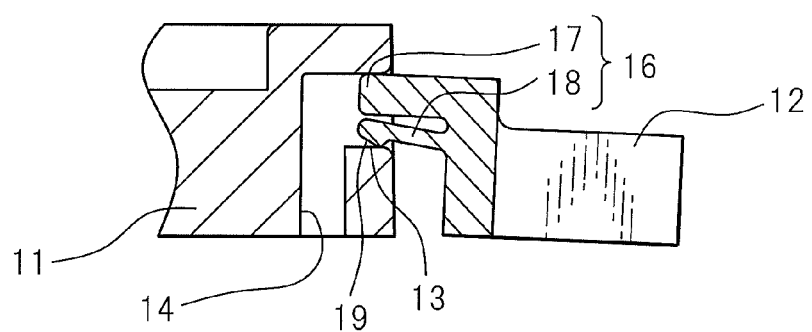
FIG. 5c is a sectional view of a major portion illustrating a process for disassembling the base plate according to the first embodiment of the invention.

To remove the fixing piece 12 from the base body 11, on the other hand, the distal end of the leaf spring 18 is resiliently deformed toward the insertion plate 17, as shown in FIG. 5b, by exerting a downward force with an axis extending on a bottom side of contact surface between the base body 11 and the fixing piece 12. The fixing piece 12 is then pulled out in the lateral direction, as shown in FIG. 5c, and is removed from the base body 11. In the described manner, the fixing piece 12 can be attached and detached.

In this embodiment, the recessed portion 13 is formed on every side surface of the base body 11. This allows the fixing pieces 12 to be attached to the base body 11 perpendicularly to an axis of flow passage, as shown in FIG. 2, or in the same direction as the axis of the flow passage, as shown in FIG. 3.

Figure 6:
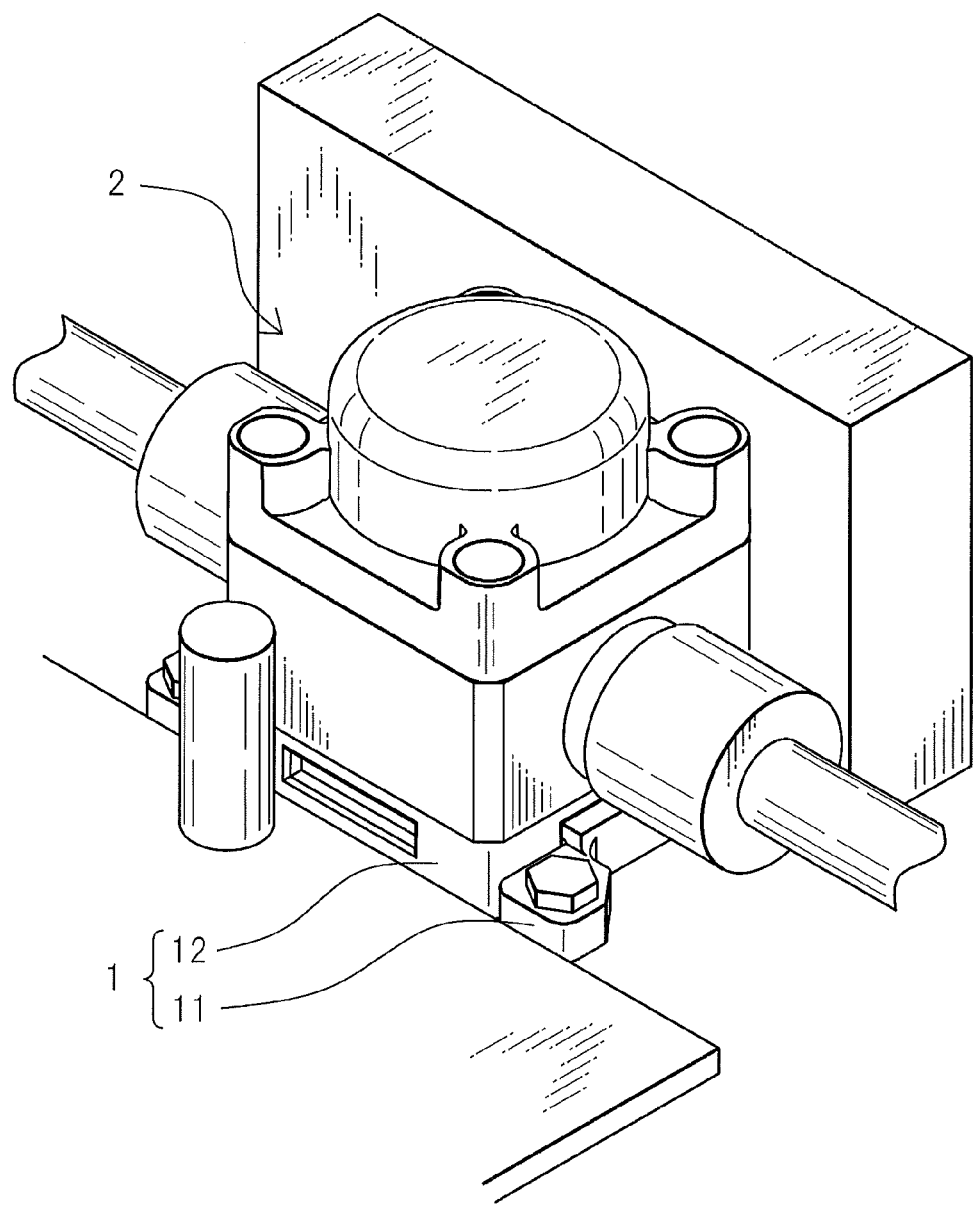
FIG. 6 is a perspective view illustrating an instillation of the constant pressure valve by means of the base plate of FIG. 3.

As a constant pressure valve 2 is installed in a pipeline such as one shown in FIG. 6, if the fixing piece 12 of the base plate 1 is attached to the base body 11 perpendicularly to the axis of the flow passage (see FIG. 2), the fixing piece 12 interferes with an obstacle and the constant pressure valve 2 cannot be installed. In such a case, the fixing piece 12 is detached from the base body 11 and then attached to a recessed portion 13 on the side surface in the same direction as the axis of the flow passage (see FIG. 3). Then the fixing pieces 12 does not give rise to an interference with the obstacle, and the constant pressure valve 2 can be easily fixed onto the installation surface even in a narrow installation space.

Preferably, the fixing pieces 12 are attached to two opposing side surfaces of the base body 11. Depending on a condition at an installation site, however, the fixing pieces 12 may be attached to two adjacent side surfaces of the base body 11, or the fixing piece 12 may be attached to only one side surface of the base body 11. In the case where the constant pressure valve 2 does not have to be fixed, the fixing pieces 12 may be removed, and the base body 11 alone may then be used as a base plate. In such a case, the fixing pieces 12 may be attached as required.

When the fixing piece 12 is attached to the base body 11, it is provided such that, as shown in FIG. 5a, the height h of the bottom surface of the fixing piece 12 from the installation surface is higher than the bottom surface of the base body 11 by a predetermined amount (e.g., 0.5 mm). This allows the base body 11 to be strongly pressed onto the installation surface to fasten the base plate 1, as the base plate 1 is fixed onto the installation surface by means of bolts, and thus, the constant pressure valve 2 can be firmly fixed onto the installation surface. As the height h of the bottom surface of the fixing portion 12 from the installation surface increases, stress concentrates to the fixing piece 12 with the base plate 1 fixed by means of the bolts. It is, therefore, preferable that the height h is in the range of 0.1 mm to 1 mm and, more preferably, in the range of 0.3 mm to 0.7 mm.

As a mounting portion 11a for mounting the main body 3 of the constant pressure valve 2, as shown in FIG. 1, a stepped portion 20 in the form of a circular recess is formed at a central portion on the upper surface of the base body 11, and a cut-out recessed portion 21 in the form of a circular recess is formed in a central portion of the stepped portion 20. A breathing hole 22 in communication with the cut-out recessed portion 21 is formed in the bottom surface of the base body 11. A bolt hole 11b is formed at each of four corners of the base body 11. Bolts (not shown) that penetrate through the bonnet 4 and the main body 3 are screwed into these bolt holes 11b. In this manner the main body 3 and the bonnet 4 are fixed to the base plate 1. Alternatively, the bolt holes 11b may be formed simply as through holes, and the bolts extending beyond the bolt holes 11b may be screwed into nuts provided on the opposite side of the base body 11.

The width of the fixing piece 12 is substantially equal to the width of the base body 11, or is at least narrower than the width of the base body 11. This allows a plurality of constant pressure valves 2 with the fixing pieces 12 attached to the base bodies 11 to be arranged in parallel, as shown in FIG. 3, without interfering with one another. In the case where the plurality of constant pressure valves 2 are arranged in parallel, coupling members may be fitted into the opposing recessed portions 13 of the base bodies 11 of the adjacent constant pressure valves 2 so as to couple the constant pressure valves 2 to one another.

Next, the constitution of the constant pressure valve 2 will be described with reference to FIG. 4. The constant pressure valve 2 includes, inside the main body 3 and the bonnet 4, a spring receiver 5, a piston 6, a spring 7, a first valve mechanism 8, a second valve mechanism 9 and a third valve mechanism 10.

The main body 3 is made of polytetrafluoroethylene (hereinafter referred to as "PTFE"). A first air gap 24 with an open upper face and a second air gap 23 with an open bottom face are provided within the main body 3. The first air gap 24 and the second air gap 23 are in communication with each other through a central communication hole 27. The first air gap 24 is greater in diameter than the second air gap 23. The diameter of the second air-gap 23 is larger than the diameter of the communication hole 27. On the opposite side surfaces of the main body 3 are provided a pair of tubular portions 3a in a protruding manner. One tubular portion 3a defines an inlet flow path 25 inside thereof, while the other tubular portion 3a defines an outlet flow path 26 inside thereof. The inlet flow path 25 is in communication with the first air gap 24, and the outlet flow path 26 is in communication with the second air gap 23. A valve seat 28 is formed on an upper face of the second air gap 23.

The bonnet 4 is made of PVDF. A stepped portion 30 is formed in the inner circumferential surface at the bottom portion of the bonnet 4. A cylindrical air gap 29 extends over the stepped portion 30. On the side wall of the bonnet 4 are provided an air feed hole 31 through which compressed air is fed from the outside into the air gap 29, and a discharge hole 32 through which a very small amount of the compressed air introduced via the air feed hole 31 is discharged to the outside, in such a manner that the air feed hole 31 and the discharge hole 32 are spaced apart from each other in the vertical direction. If not necessary, the discharge hole 32 may be omitted.

The spring receiver 5 is made of PVDF, forming a substantially cylindrical shape in its entirety and having a through hole 33 at its central portion. The spring receiver 5 is fixed integrally to the bonnet 4 with an outer circumferential surface of the spring receiver 5 fittingly inserted into the stepped portion 30 of the bonnet 4. Annular grooves are formed on the outer circumferential surface of the spring receiver 5. O-rings are fitted into the annular grooves to prevent the compressed air from flowing out to the outside from the bonnet 4.

The piston 6 made of PVDF is provided movably upward and downward inside the bonnet 4. The piston 6 has a piston shaft 35 of a substantially cylindrical shape and a disk-like flange portion 34 formed at an upper portion of the piston shaft 35 and having a greater diameter than the piston shaft 35. The inner circumferential surface of the piton shaft 35 is internally threaded. The piston shaft 35 has a smaller diameter than the through hole 33 of the spring receiver 5. The piston 6 is arranged above the spring receiver 5, and an upper surface of the flange portion 34 is facing an upper surface in the interior of the bonnet 4.

The spring 7 made of a stainless steel is interposed between a lower end surface of the flange portion 34 of the piston 6 and an upper end surface of the spring receiver 5. The spring 7 can be stretched or compressed as the piston 6 moves upward or downward. Preferably, the spring 7 has a large free length, so that loads borne by the spring 7 vary little.

The first valve mechanism 8 made of PTFE is externally threaded at an upper end of a shaft portion 37 thereof, the externally threaded portion being screwed into the inner circumferential surface of the piston shaft 35. The shaft portion 37 has a greater diameter at its lower end. A first diaphragm 36 extends radially outward on an outer circumferential surface of the shaft portion 37. The shaft portion 37 is internally threaded on an inner surface around the center of the shaft portion 37, the internally threaded portion extending upward from the bottom surface of the shaft portion 37. The first diaphragm has a membrane portion with its outer circumferential edge held between the main body 3 and the spring receiver 5. A first valve chamber 38 is formed in a sealed manner under the first diaphragm 36. An air chamber is formed above the first diaphragm 36 in a sealed manner, the air chamber being filled with the compressed air fed through the air feed hole 31 of the bonnet 4.

The second valve mechanism 9 made of the PTFE is externally threaded at an upper end of a shaft portion 40 thereof, the externally threaded portion being screwed into the internally threaded portion of the first valve mechanism 8. The second valve mechanism 9 is arranged in the second air gap 23 of the main body 3, and has a valve body 39 of a greater diameter than the communication hole 27. The valve body 39 is internally threaded on an inner surface around the center of the valve body 39, the internally threaded portion extending upward from the bottom surface of the valve body 39. The third valve mechanism 10 may be formed integrally with the second valve mechanism 9.

The third valve mechanism 10 made of the PTFE is externally threaded at an upper end of a rod 41 thereof, the externally threaded portion being screwed into the internally threaded portion of the second valve mechanism 9. A second diaphragm 42 extends radially outward on an outer circumferential surface at the lower end of the rod 41. The second diaphragm 42 has a greater thickness at its outer circumferential edge, i.e., at a portion facing the stepped portion 20 on the upper surface of the base plate 1. The portion where the second diaphragm 42 has the greater thickness is arranged on the stepped portion 20, and is held between the base plate 1 and the main body 3. In this manner the second air gap 23 of the main body 3 and the second diaphragm 42 define a second valve chamber 43 in a sealed manner.

Operation of the above constant pressure valve 2 will now be described. The valve body 39 of the second valve mechanism 9 is subject to an upward urging force due to the spring 7 and fluid pressure on a lower surface of the first diaphragm 36, while it is subject to a downward urging force due to operation pressure on an upper surface of the first diaphragm 36. Strictly speaking, both the lower surface of the valve body 39 and the upper surface of the second diaphragm 42 are subject to the fluid pressure. However, their surface areas subject to the fluid pressure are designed to be substantially equal to each other, and thus the force acting on one of the two are to be substantially cancelled by the force acting on the other. Therefore, the valve body 39 of the second valve mechanism 9 remains still at a position where the above three forces (the spring force, the fluid pressure on the lower surface of the first diaphragm, the operation pressure on the upper surface of the first diaphragm) are balanced.

Upon increasing the operation pressure that is provided from an electro-pneumatic converter (not shown) to the constant pressure valve 2 through the air feed hole 31, force for pushing the first diaphragm 36 down increases. This increases an opening area of a fluid control portion formed between the valve body 39 of the second valve mechanism 9 and the valve seat 28, and pressure in the first valve chamber 38 increases. Contrarily, if the operation pressure provided to the constant pressure valve 2 decreases, the opening area of the fluid control portion decrease, and the pressure in the first valve chamber 38 decreases. As such, any pressure can be set for the first valve chamber 38 by adjusting the operation pressure.

In this state, if the fluid pressure increases in the upstream of the constant pressure valve 2, the pressure in the first valve chamber 38 also increases instantaneously. Then the force acting on the lower surface of the first diaphragm 36 due to the fluid becomes greater than the operation pressure acting on the upper surface of the first diaphragm 36 due to the compressed air, whereby the first diaphragm 36 moves upward and the valve body 39 also moves upward together. Therefore, the opening area of the fluid control portion between the valve body 39 and the valve seat 28 decreases, and the fluid pressure in the first valve chamber 38 decreases. Eventually, the valve body 39 moves to a position where the above three forces are balanced, and remains still. Unless the load of the spring 7 varies greatly, the pressure in the gap 29 or the force acting on the upper surface of the first diaphragm 36 remains constant, and therefore, the pressure on the lower surface of the first diaphragm 36 remains substantially constant. Accordingly, the fluid pressure on the lower surface of the first diaphragm 36, i.e., the fluid pressure in the first valve chamber 38, remains substantially unchanged before and after an increase in the pressure in the upstream.

On the other hand, if the fluid pressure decreases in the upstream of the constant pressure valve 2, the pressure in the first valve chamber 38 also decreases instantaneously. Then the force acting on the lower surface of the first diaphragm 36 due to the fluid becomes smaller than the operation pressure acting on the upper surface of the first diaphragm 36 due to the compressed air, whereby the first diaphragm 36 moves downward and the valve body 39 also moves downward together. Therefore, the opening area of the fluid control portion between the valve body 39 and the valve seat 28 increases, and the fluid pressure in the first valve chamber 38 increases. Eventually, the valve body 39 moves to a position where the above three forces are balanced, and remains still. Accordingly, the fluid pressure in the first valve chamber 38 remains substantially unchanged before and after a decrease in the pressure in the upstream, as in the case where the pressure in the upstream increases.

The base plate according to the first embodiment of the invention operates to exhibit effects as follows:

(1) The base body 11 is provided on its upper surface with the mounting portion 11a for mounting the constant pressure valve 2. The fixing piece 12 is detachably attached to the side surface of the base body 11, and the base plate 1 is fixed onto the installation surface with bolt-fastened portions 15 formed in the fixing pieces 12. Therefore, the base plate 1 is provided such that an object to be fixed of any size and any shape such as the constant valve 2 can be easily fixed onto the installation surface, thereby providing a wide range of use and applicability;

(2) If the constant pressure valve 2 does not have to be fixed to the installation surface, then the constant pressure valve 2 can be used with the fixing pieces 12 removed from the base body 11, which allows the constant pressure valve 2 to be constituted in a compact size. When the constant pressure valve 2 must be fixed to the installation surface due to, for example, changes in the pipeline, the constant pressure valve 2 can be easily fixed to the installation surface by means of bolts by attaching the fixing pieces to the base body 11;

(3) The recessed portion 13 for attaching the fixing piece is formed on each side surface of the base body 11. This allows for changes in the position of the fixing piece 12 for attachment. It in turn allows the constant pressure valve 2 to be easily installed even in a narrow and tight place, while preventing interference between the fixing pieces 12 and an obstacle near the installation surface. That is, the positions for attaching the fixing pieces 12 to the base body 11 can be changed depending on a condition in which piping members are installed. In the case where the fixing piece 12 interferes with a wall surface or other apparatuses, the base plate 1 is installed while avoiding such interference;

(4) Since the recessed portions 13 are formed on the side surfaces of the base body 11, and the corresponding protruded portion 16 is provided at the end of the fixing piece 12, the fixing piece 12 can be fitted into the base body 11 by pushing the protruded portion 16 to the recessed portion 13 to facilitate the fitting between the base body 11 and the fixing piece 12;

(5) Since the recessed portions 13 are formed in the widthwise direction of the base body 11, and the groove portions 14 in communication with the recessed portions 13 are formed on the bottom surface of the base body 11 in the widthwise direction of the base body 11, the end of the protruded portion 16 can be brought into engagement with the groove portion 14;

(6) With the protruded portion 16 having a projection 19 at its end, the protruded portion 16 can be easily brought into engagement with the groove portion 14;

(7) Since the protruded portion 16 includes the insertion plate 17 and the leaf spring 18 that are formed in a protruding manner in substantially parallel with each other, the protruded portion 16 can be easily engaged and fixed in the recessed portion 13 with the aid of resilient deformation of the leaf spring 18; and (8) Since the height h of the bottom surface of the fixing piece 12 from the installation surface is greater, by a predetermined amount (about 0.1 mm to about 1 mm), than the height of the bottom surface of the base body 11 from the installation surface, the base plate 1 can be firmly fixed onto the installation surface.

Figure 13:
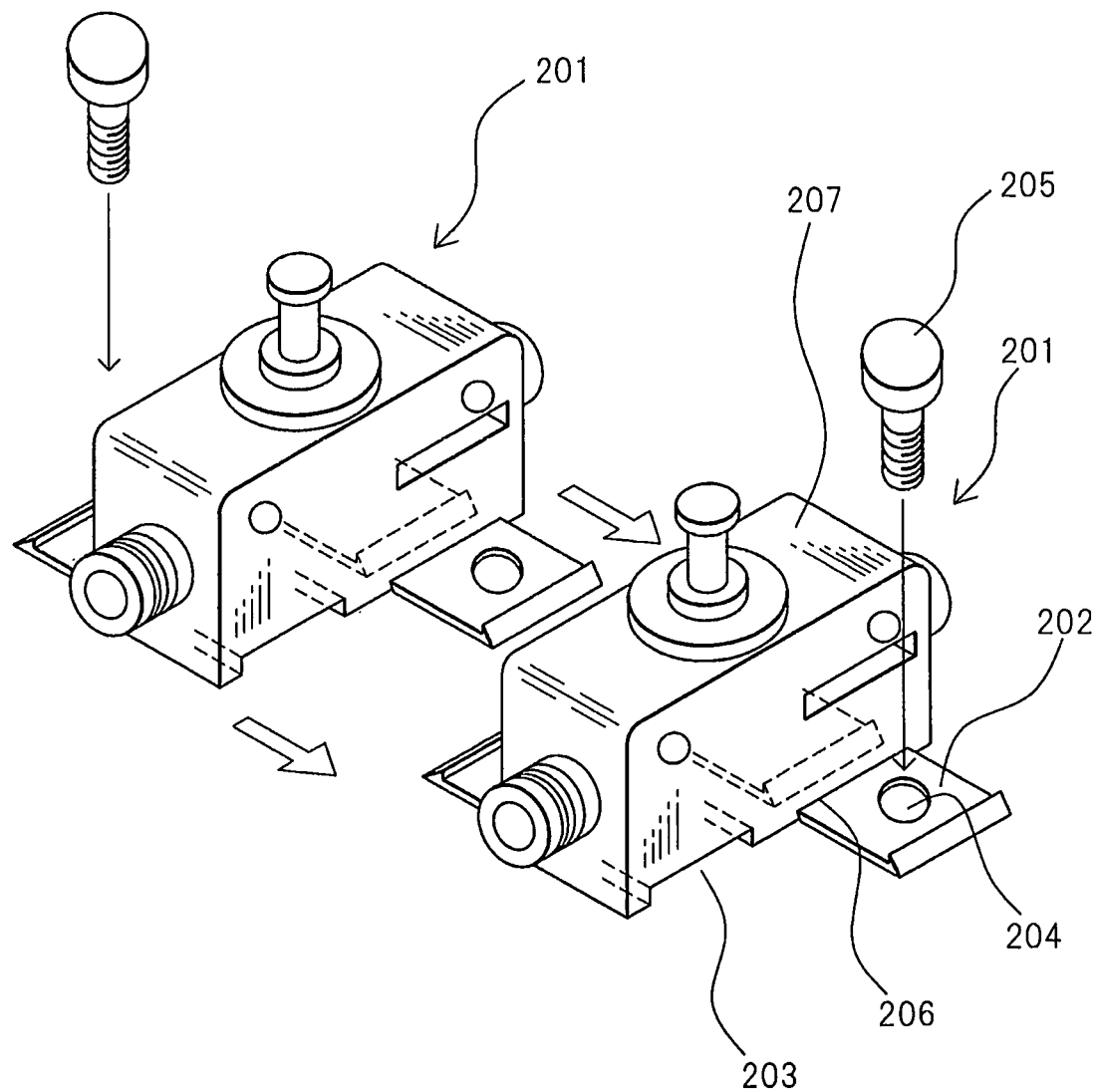
FIG. 13 is a view illustrating a comparative example to explain the present invention.
Figure 14:
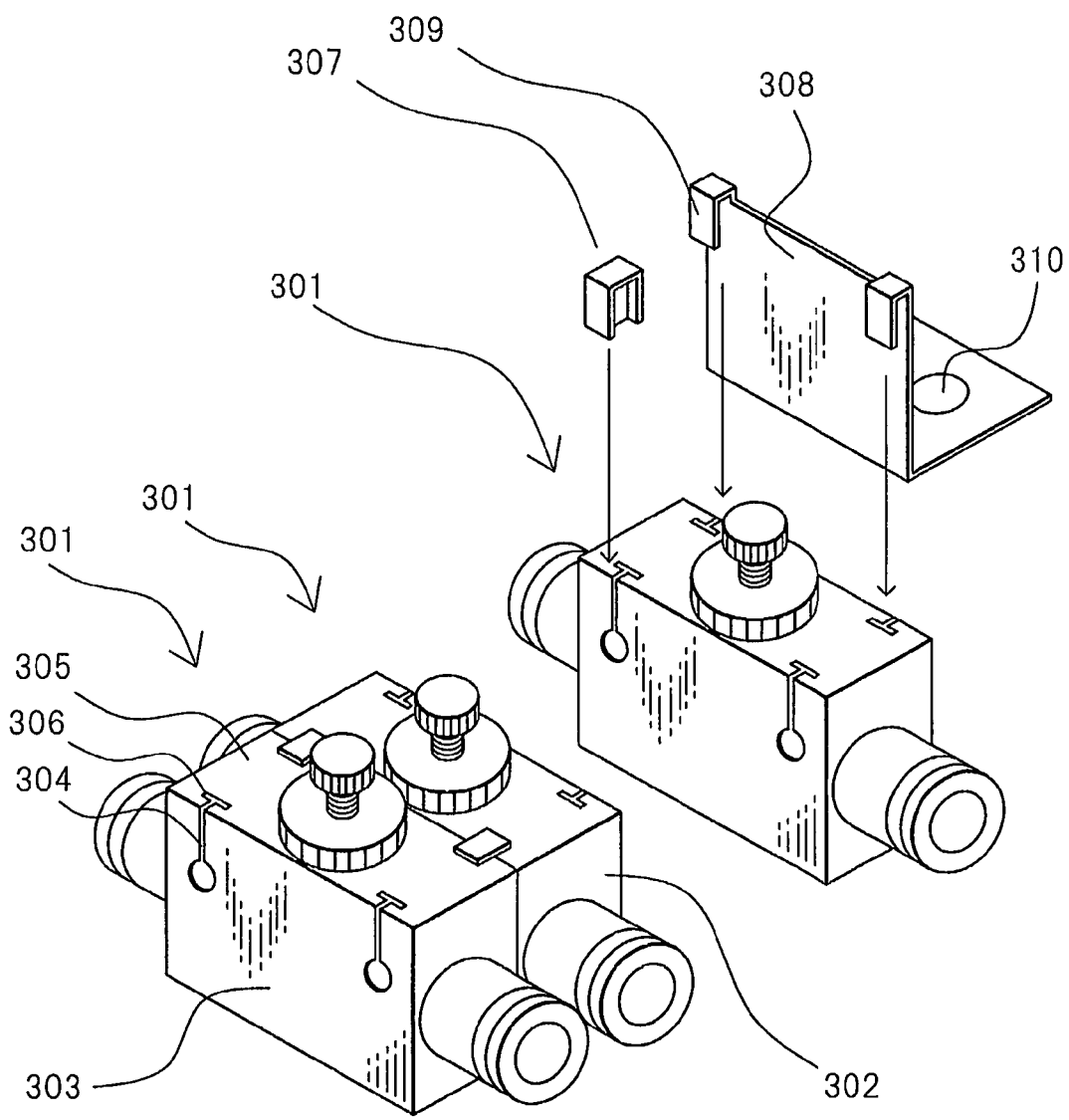
FIG. 14 is a view illustrating a conventional structure for mounting a flow rate adjusting valve on a fixing surface.

FIG. 13 is a view showing a comparative example to explain the first embodiment of the present invention, illustrating a coupling mechanism for coupling speed control valves. In FIG. 13, one of the adjacent speed control valves 201 is provided with a coupling hook 202, while the other one is provided with a hooked groove 203. With hooked engagement between the hooked groove 203 and the coupling hook 202, the adjacent speed control valves 201 are coupled together. By screwing an attaching screw 205, which is inserted through an attaching hole 204 of the coupling hook 202, into a fixed base (the installation surface), the speed control valves 201 are fixed to the installation surface. If the coupling hook 202 is not fixed to the fixed base by a bolt, then the coupling hook 202 is folded along its proximal edge portion 206 for accommodation.

In such a coupling mechanism for coupling the speed control valves, a notch must be formed at the root edge 206 so that the coupling hook 206 can be folded. However, a portion of the coupling hook 206 where the notch is formed has a very small thickness and may break when the speed control valve 201 is subject to great external physical force. Further, the coupling hook 202 serves to couple the speed control valves 201 together and to fix them to the fixed base, and therefore, the speed control valves 201 are fixed by means of bolts at two positions aslant to the axis of the flow passage. This method of fixing the valves results in lack of stability, and, in particular, with sizable valves, the fixing becomes unsatisfactory. In addition, since the speed control valve 201 is integrally molded with the valve body 207 in a manner that the coupling hook 202 significantly extends toward the exterior from the valve body 207, a mold used therefor becomes remarkably bulky as compared to the size of the valve body 207 itself.

In contrast, in this embodiment, the fixing piece 12 is detachably attached to the base body 11. Therefore, there is no need to fold a fixing piece 12, thereby preventing breakage of the fixing piece 12. Further, since the protruded portion 16 of the fixing piece 12 is to be fitted to the recessed portion 13 at the center in the widthwise direction of the base body 11, and the fixing piece 12 is fastened by means of bolts at the bolt-fastened portions 15 at both ends in the widthwise direction of the fixing pieces 12. Therefore, the base plate 1 can be stably fixed at positions symmetrical relative to the axis of the flow passage of the constant pressure valve 2. Moreover, since the constant pressure valve 2 and the fixing pieces 12 are separate from each other, a mold of a small size may be used for producing the constant pressure valves 2.

Second Embodiment

A second embodiment of the invention will now be described with reference to FIG. 7. The second embodiment is different from the first embodiment in the shape of a fitting portion where the fixing piece is fitted to the base body. The following description mainly concerns the difference from the first embodiment.

Figure 7:
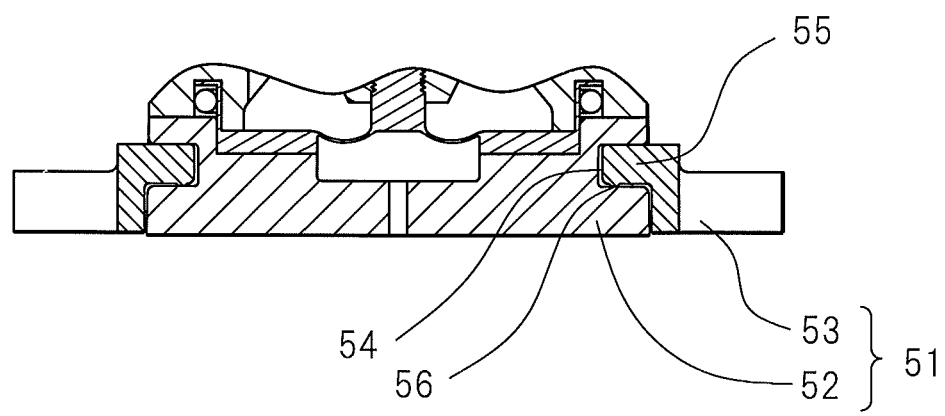
FIG. 7 is a sectional view of a major portion of the constant pressure valve to which a base plate according to a second embodiment of the invention is applied.

FIG. 7 is a sectional view of a major portion of a base plate 51 in an assembled state according to the second embodiment. In FIG. 7, the base plate 51 made of PVDF includes a plate-like base body 52 and a pair of fixing pieces 53 fitted to the base body 52. A recessed portion 54 with bottom is formed on every side surface of the base body 52. Similarly to the fixing piece 12 according to the first embodiment, each fixing piece 53 has bolt-fastened portions formed at two positions and a protruded portion 55 that protrudes to fit to the recessed portion 54 in the base body 52. At the end of the protruded portion 55, it has a projection 56 extending downward. The projection 56 is formed in a linear shape, but may be formed in any other shape including, but not limited to, an annular shape. In order to firmly fit the fixing piece 53 to the base body 52, the protruded portion 55 may be provided with a plurality of projections 56, or the recessed portion 54 may be provided with a groove portion with which the projection 56 comes to engagement.

When the fixing piece 53 is attached to the base body 52, the protruded portion 55 of the fixing piece 53 is pushed and fitted into the recessed portion 54 of the base body 52. Here, the projection 56 of the protruded portion 55 serves to prevent the fixing piece 53 from being pulled out. In order to detach the fixing piece 53 from the base body 52, the fixing piece 53 is forcibly pulled away from the base body 52.

Third Embodiment

A third embodiment of the present invention will now be described with reference to FIG. 8. The third embodiment is different from the first embodiment in the shape of a fitting portion where the fixing piece is fitted to the base body. The following description mainly concerns the difference from the first embodiment.

Figure 8:
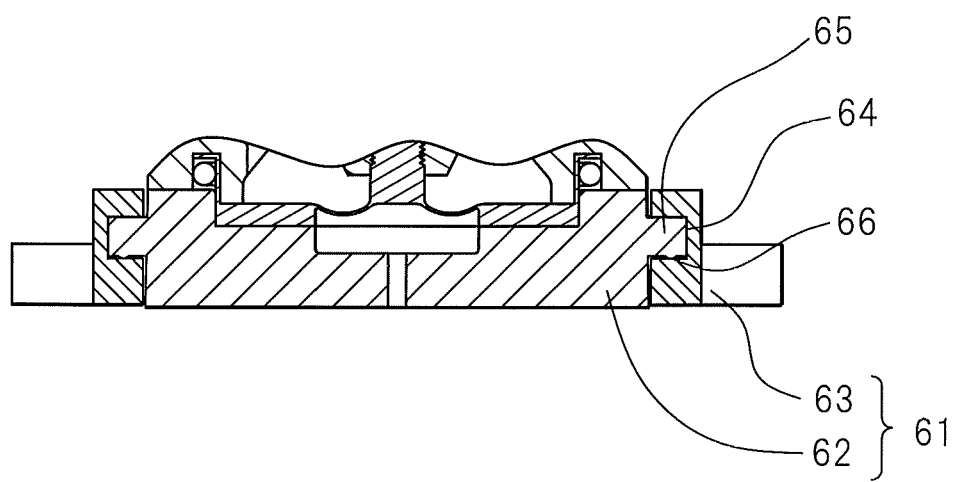
FIG. 8 is a sectional view of a major portion of the constant pressure valve to which a base plate according to a third embodiment of the invention is applied.

FIG. 8 is a sectional view of a major portion of a base plate 61 in an assembled state according to the third embodiment. In FIG. 8, the base plate 61 made of PVDF includes a plate-like base body 62 and a pair of fixing pieces 63 fitted to the base body 62. Similarly to the fixing piece 12 of the first embodiment, the fixing piece 63 has bolt-fastened portions at two positions, and a recessed portion 64 with bottom formed on its end surface. A protruded portion 65 extending from every side surface of the base body 62 to fit to the recessed portion 64 in the fixing piece 63. The protruded portion 65 has at its end a projection 66 extending downward. The projection 66 is formed in a linear shape, but may be formed in any other shape including, but not limited to, an annular shape. In order to firmly fit the fixing piece 63 to the base body 62, the protruded portion 65 may be provided with a plurality of projections 66, or the recessed portion 64 may be provided with a groove portion with which the projection 66 is in engagement.

When the fixing piece 63 is attached to the base body 62, the protruded portion 65 of the base body 62 is pushed and fitted into the recessed portion 64 of the fixing piece 63. The projection 66 of the protruded portion 65 serves to prevent the fixing piece 63 from being pulled out. In order to detach the fixing piece 63 from the base body 62, the fixing piece 63 is forcibly pulled away from the base body 62.

Fourth Embodiment

A fourth embodiment of the present invention will now be described with reference to FIGS. 9a and 9b. The fourth embodiment is different from the first embodiment in the shape of a fitting portion where the fixing piece is fitted to the base body. The following description mainly concerns the difference from the first embodiment.

Figure 9A:
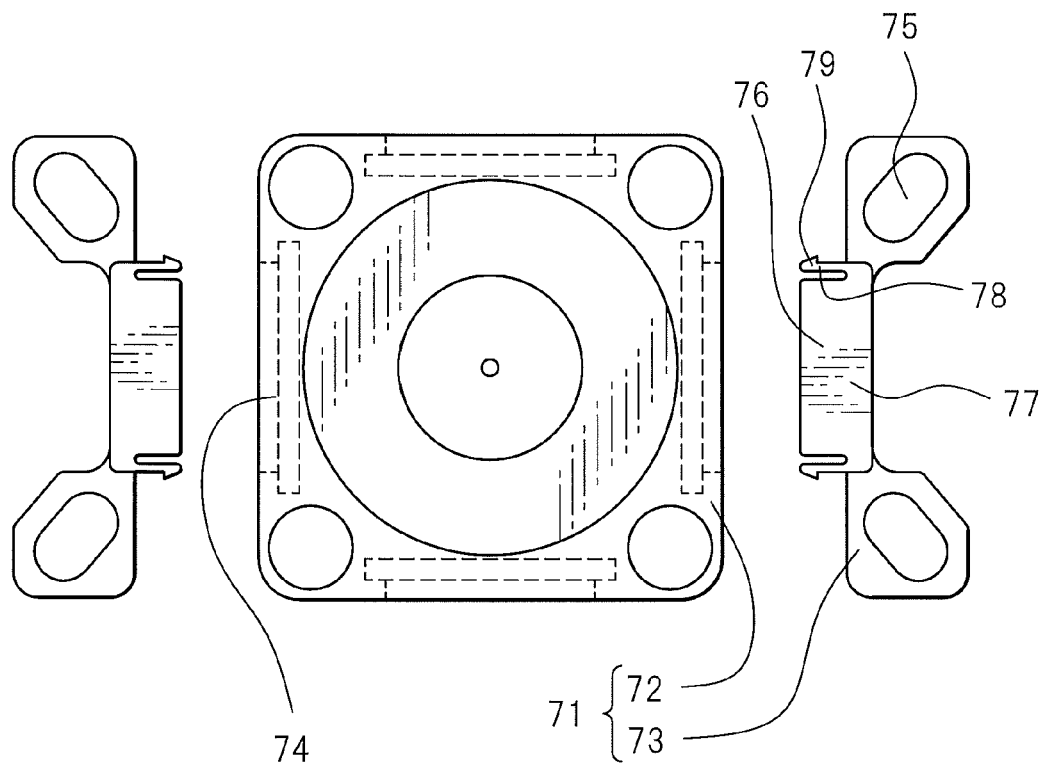
FIG. 9a is a plan view of the constant pressure valve to which a base plate according to a fourth embodiment of the invention is applied.
Figure 9B:
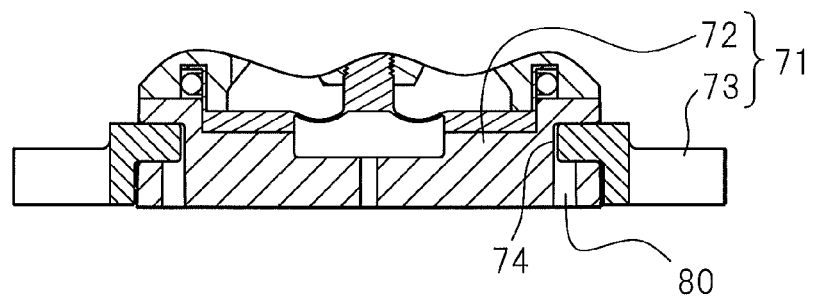
FIG. 9b is a sectional view of a major portion of the constant pressure valve to which the base plate according to the fourth embodiment of the invention is applied.

FIG. 9a is a plan view of a base plate 71 according to the fourth embodiment of the invention in a disassembled state. FIG. 9b is a sectional view of a major portion of the base plate 71 in an assembled state. In FIGS. 9a and 9b, the base plate 71 made of PVDF includes a plate-like base body 72 and a pair of fixing pieces 73 fitted to the base body 72. A recessed portion 74 is formed on every side surface of the base body 72. The base body 72 is provided in its bottom surface with groove portions 80 in the widthwise direction, the groove portions 80 being in communication with the recessed portions. Each fixing piece 73 is provided with bolt-fastened portions 75 at two positions, and has a protruded portion 76 adapted to fit to the recessed portion 74 in the base body 72. The protruded portion 76 has an elongated insertion plate 77 of a substantially rectangular parallelepiped shape in the widthwise direction, and leaf springs 78 protruding at both ends of the insertion plate 77 in the widthwise direction and spaced apart from the insertion plate 77. The leaf spring 78 has a projection 79 extending outward from its end in the widthwise direction.

When the fixing piece 73 is attached to the base body 72, the protruded portion 76 of the fixing piece 73 is pushed into the recessed portion 74 of the base body 72. In this process, the ends of the leaf springs 78 are resiliently deformed toward the insertion plate 77. When the protruded portion 76 is pushed at a maximum degree, the projections 79 at the ends of the leaf springs 78 engage with the groove portion 80 of the base body 72, and the protruded portion 76 is then fitted to the recessed portion 74. In order to detach the fixing piece 73 from the base body 72, a compressive force is applied onto the outer sides of the leaf springs 78, causing the leaf springs 78 to resiliently deform toward the insertion plate 77. While doing so, the fixing piece 73 is detached from the base body 72.

Fifth Embodiment

A fifth embodiment of the invention will now be described with reference to FIGS. 10a and 10b. The fifth embodiment is different from the first embodiment in the shape of a fitting portion where the fixing piece is fitted to the base body. The following description mainly concerns the difference from the first embodiment.

Figure 10A:
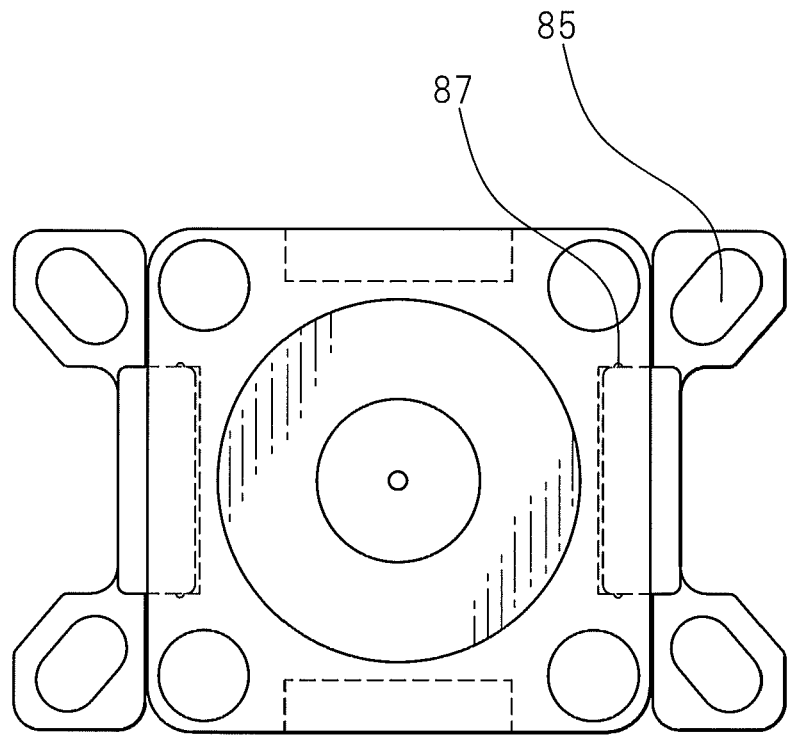
FIG. 10a is a plan view of the constant pressure valve to which a base plate according to a fifth embodiment of the invention is applied.
Figure 10B:
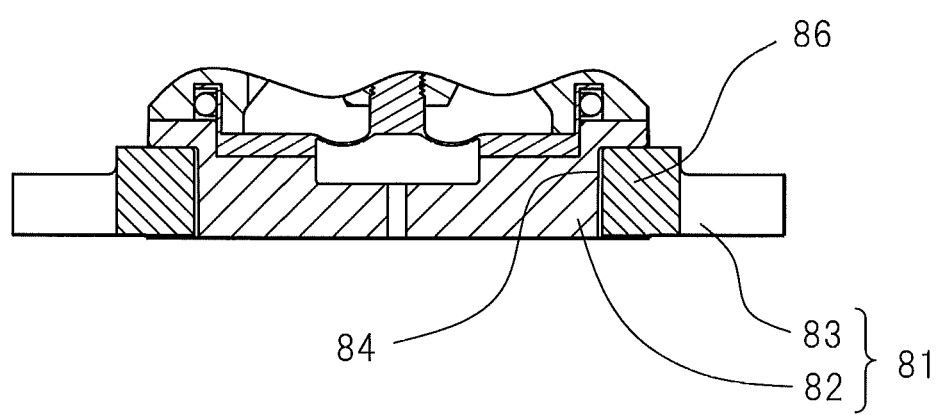
FIG. 10b is a sectional view of a major portion of the constant pressure valve to which the base plate according to the fifth embodiment of the invention is applied.

FIG. 10a shows a plan view of a base plate 81 according to the fifth embodiment in an assembled state and FIG. 10b shows a sectional view of a major portion thereof. In FIGS. 10a and 10b, the base plate 81 made of PVDF includes a plate-like base body 82 and a pair of fixing pieces 83 fitted to the base body 82. A recessed portion 84 is formed on every side surface of the base body 82, extending into the bottom surface. Each fixing piece 83 has bolt-fastened portions 85 at two positions for fixing and has a protruded portion 86 adapted to fit to the recessed portion 84 in the base body 82. The protruded portion 86 has projections 87 laterally extending from the side surfaces at an end thereof. In order to firmly fit the fixing piece 83 to the base body 82, the protruded portion 86 may be provided with a plurality of projections 87, or the recessed portion 84 may be provided with groove portions with which the projections 87 is in engagement.

When the fixing piece 83 is attached to the base body 82, the protruded portion 86 of the fixing piece 83 is pushed and fitted into the recessed portion 84 of the base body 82. The projections 87 of the protruded portion 86 serves to prevent the fixing piece 83 from being pulled out. In order to detach the fixing piece 83, the fixing piece 83 is forcibly pulled away in the lateral direction so as to be removed from the base body 82. In this case, since the recessed portions 84 have been formed from the side surfaces through up to the bottom surface, even in a state where the fixing pieces 83 have been fixed onto the installation surface, an object to be fixed (a constant pressure valve 2) may be separated from the fixing piece 83 with the base body 82 fixed thereto by forcibly pulling the object upward. In this manner that the object together with the base body 82 can be attached onto, and detached from the installation surface, i.e., the fixing pieces 83, while the fixing pieces 83 remain fixed to the installation surface, there is no need to attach or detach fastening bolts for the fixing pieces 83 in a case where the object must be frequently removed from the installation surface for replacement or maintenance. Accordingly, the operation time can be shortened.

Sixth Embodiment

A sixth embodiment of the present invention will now be described with reference to FIGS. 11a and 11b. The sixth embodiment is different from the first embodiment in the shape of a fitting portion where the fixing piece is fitted to the base body and, specifically, the shape of fixing pieces. The following description mainly concerns the difference from the first embodiment.

Figure 11A:
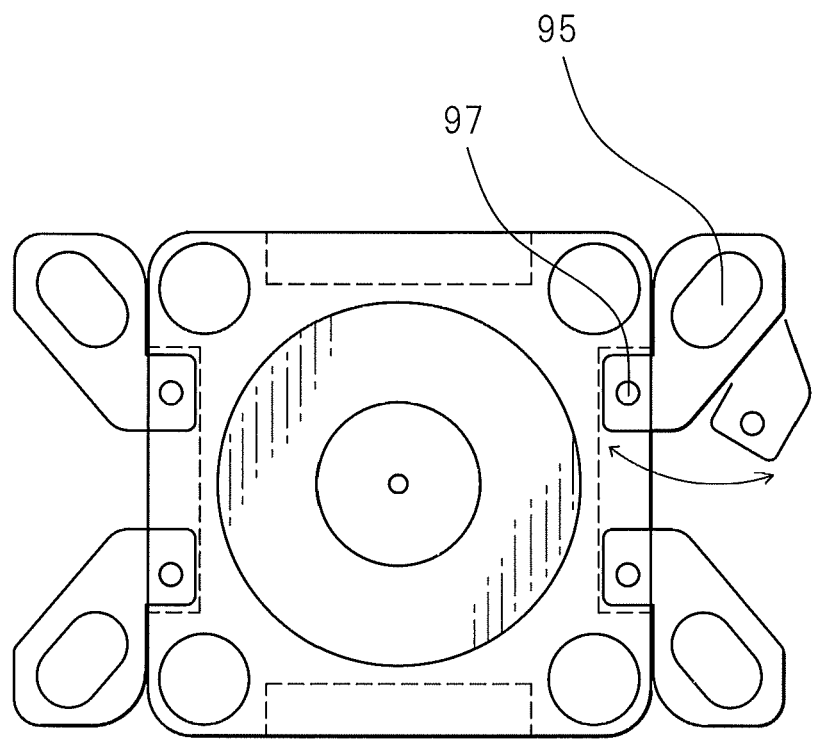
FIG. 11a is a plan view of the constant pressure valve to which a base plate according to a sixth embodiment of the invention is applied.
Figure 11B:
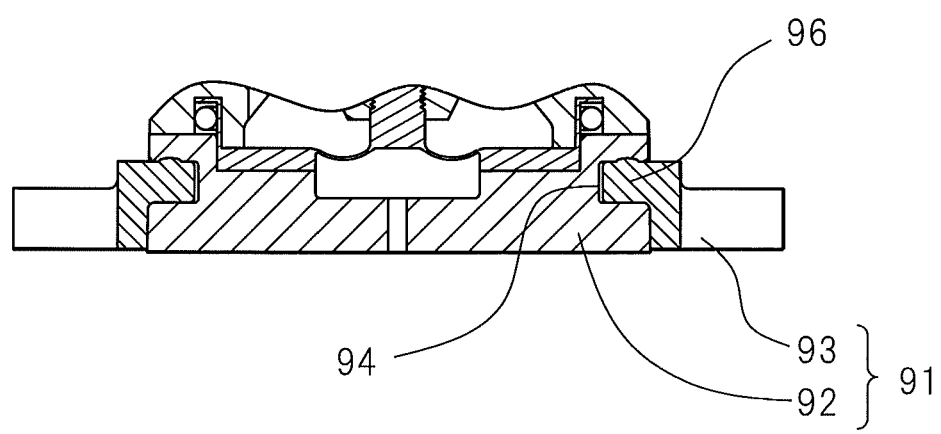
FIG. 11b is a sectional view of a major portion of the constant pressure valve to which the base plate according to the sixth embodiment of the invention is applied.

FIG. 11a shows a plan view of a base plate 91 according to the sixth embodiment in an assembled state and FIG. 11b shows a sectional view of a major portion thereof. In FIGS. 11a and 11b, the base plate 91 made of PVDF includes a plate-like base body 92 and a plurality of fixing pieces 93 fitted to the base body 92. A recessed portion 94 is formed on every side surface of the base body 92, and the pair of fixing pieces 93 is symmetrically attached to each recessed portion 94. Each fixing piece 93 is provided with a single bolt-fastened portion 95 at one end thereof and with a protruded portion 96 adapted to fit into to the recessed portion 94 at the other end. The protruded portion 96 has at its end a projection 97 extending upward. In order to firmly fit the fixing piece 93 to the base body 92, the protruded portion 96 may be provided with a plurality of projections 97, or the recessed portion 94 may be provided with groove portions with which the protuberances 97 is in engagement.

When the fixing piece 93 is attached to the base body 92, the protruded portion 96 of the fixing piece 93 is pushed and fitted into the recessed portion 94 of the base body 92. The projection 97 of the protruded portion 96 serves to prevent the fixing piece 93 from being pulled out. In order to detach the fixing piece 93, the fixing piece 93 is forcibly pulled away from the base body 92. Further, in the sixth embodiment, the fixing piece 93 can be turned in a horizontal direction (direction of an arrow in FIG. 11a) with the bolt-fastened portion 95 as a center, while the fixing piece 93 remains fixed to the installation surface. Namely, the fixing piece 93 can be detached from the base body 92, while an object to be fixed remains coupled to the base body 92.

Seventh Embodiment

A seventh embodiment of the invention will now be described with reference to FIG. 12. The seventh embodiment is different from the first embodiment in the constitution of an object to be fixed to which the base plate is applied. Specifically, in the first embodiment, the base plate is applied to the constant pressure valve, but in the seventh embodiment, it is applied to an opening/closing valve. The constitution of the base plate is the same as that of the first embodiment. The following description mainly concerns the difference from the first embodiment.

Figure 12:
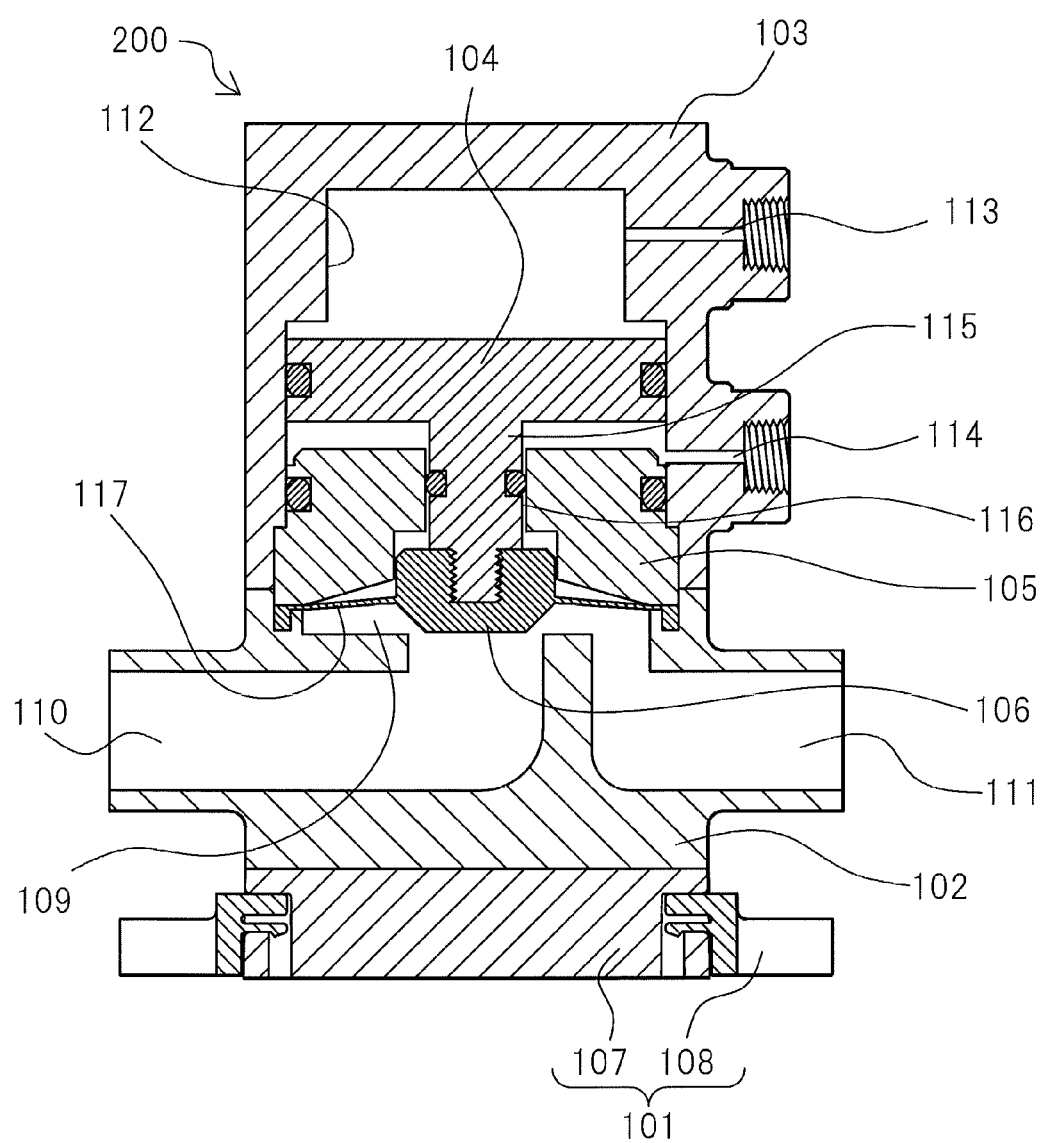
FIG. 12 is a sectional view of an opening/closing valve to which a base plate according to a seventh embodiment of the invention is applied.

FIG. 12 shows a sectional view of the internal structure of an opening/closing valve 200 according to the seventh embodiment. In FIG. 12, a base plate 101 is formed as a base body part for fixing the opening/closing valve 200 onto the installation surface, and the lower end of the main body 102 of the opening/closing valve 200 is mounted on the upper surface of the base plate 101. The opening/closing valve 200 includes the base plate 101, the main body 102, a drive portion 103, a piston 104, a diaphragm holder 105 and a valve body 106.

The main body 102 made of PTFE has a valve chamber 109 at the center of an upper end in the axial direction thereof, an inlet flow passage 110 and an outlet flow passage 111 that communicates with the valve chamber 109. The drive portion 103 made of PVDF is provided with a cylinder portion 112 of a cylindrical shape in its interior, and is fixed to the upper part of the main body 102 by means of bolts and nuts (not shown). The drive portion 103 is provided, on its side surface, with a pair of working fluid feed ports 113 and 114 that communicate with an upper side and a lower side of the cylinder portion 112. The piston 104 made of PVDF is fittingly inserted in the cylinder portion 112 of the drive portion 103 in a sealed manner and in a movable manner upward and downward in the axial direction, and has a rod portion 115 hanging down from the center of the bottom surface thereof.

The diaphragm holder 105 made of PVDF has a through hole 116 at its central portion, through which the rod portion 115 of the piston 104 penetrates, and is held between the main body 102 and the drive portion 103. The valve body 106 made of PTFE, which is contained in the valve chamber 109, penetrates through the through hole 116 of the diaphragm holder 105, and is screwed and fitted to a distal end of the rod portion 115 of the piston 104, the distal end protruding from the lower surface of the diaphragm holder 105. The valve body 106 moves upward and downward in the axial direction together with the upward and downward movement of the piston 104. The valve body 106 has a diaphragm 117 along its outer circumference, and the outer circumferential edge of the diaphragm 117 is held between the diaphragm holder 105 and the main body 102.

If compressed air is fed from the exterior through the working fluid feed port 114, the piston 104 is urged up by pressure of the compressed air. This pulls the rod portion 115 up as well as the valve body 106, and as a result, the valve opens. If the compressed air is fed, on the other hand, through the working fluid feed port 113, the piston 104 is urged down. This pushes the rod portion 115 down as well as the valve body, and as a result, the valve closes.

In the above embodiments, the base plate is applied to the constant pressure valve 2 or the opening/closing valve 200. The base plate, however, may be applied to any other object that must be installed on an installation surface. For instance, it can be preferably applied to piping members such as those connected to a pipeline for pumps and filters, as well as to valves that are installed to a piping inside various manufacturing apparatuses at a later stage and that are often installed in narrow and tight places. The types of valves preferably include, but are not limited to, a constant flow valve, a stop valve, a diaphragm valve, a needle valve, a pinch valve and a ball valve. As such, the base plate according to the invention can be used for a various objects to be fixed. Therefore, the fixing pieces are commonly available for the piping members to which the base body of the base plate of the invention is attached, irrespective of the size of these valves or irrespective of difference in the type of the piping members as in pumps and valves.

The base plate may be provided as a constituent part of the object or may be instead simply provided under the object. The base plate is comprised of the base body and the fixing pieces. Since the fixing piece can be attached to the base body simply with a recessed portion formed on a side surface of the base body, there is enough space available for forming a groove or a projection on the upper surface or inside the base body. Therefore, when it is necessary to decrease the size of the object as in a valve used for a various manufacturing apparatus, it is preferable to form in the base body a flow passage for the valve, a valve seat, a groove with a sealing member and the like, forming the base plate as a constituent part of the object.

Although in the above embodiments, a recessed portion or a protruded portion is provided on a side surface of the base body as a portion to be fitted, to which an object is fitted, it may be in any other form such as a dent or a through hole. Further, it may be formed to extend over a plurality of surfaces of the base body, for example, from a side surface up to a lower surface. In FIG. 1, the recessed portion is formed along the direction A and the direction B, which are defined as widthwise directions, but alternatively, with the direction A or direction B defined as a longitudinal directions, the recessed portion may be formed along the longitudinal direction. Although the base body is of a substantially square shape in a plan view, the base body may be of any other shape, provided that it may have a mounting portion for mounting an object to be fixed.

Although in the above embodiments, a protruded portion or a recessed portion is provided at the ends of the fixing piece as a fitting portion, it has any other shape, provided that it fits the portion to be fitted. The shape of the fixing piece is not limited to the above-mentioned shape, either. Although a bolt-fastened portion is provided with a through hole through which the fixing bolt penetrates, but may be provided with a notch instead of such a through hole. The through hole or notch of the bolt-fastened portion may be in any shape, including, but not limited to, a circular shape, an oval shape, a rectangular shape or a shape formed by connecting holes of different sizes. A projection provided on the surfaces of the protruded portions or the recessed portions and the leaf springs forming the protruded portions, are not only limited to the above-mentioned shapes.

PVDF can be used as a material of the base body and the fixing pieces of the base plate. However, there is no particular limitation and synthetic resin such as PTFE, polyvinyl chloride, polypropylene, tetrafluoroethylene/perfluoroalkylvinyl ether copolymer or polyethylene, or metal such as iron or stainless steel may also be used. With the material of the fixing piece selected to have a strength lower than that of the base body, when wearing force is generated in attaching or detaching the fixing piece or unexpected external force exerts on the object, the wearing force or the external force can be deliberately allotted to the fixing piece. Therefore, any damage to the base body, and, particularly, to the object, when the base plate is used as a constituent part of the object, can be prevented.

Although the invention has been shown and described with exemplary embodiments thereof, it should be understood by those skilled in the art that the foregoing and various other changes, omissions and additions may be made therein and thereto without departing from the spirit and scope of the invention.

The invention claimed is:

1. A base plate for fixing an object to be fixed onto an installation surface, comprising:
  a plate-like base body having a mounting portion on an upper surface thereof for mounting said object; and
  a fixing piece having bolt-fastened portions which are to be fastened onto said installation surface by means of fixing bolts, said fixing piece being detachably attached to a side surface of said base body such that said bolt-fastened portions protrude from said base body,
  wherein said base body is provided on its side surface with a portion to be fitted, and said fixing piece is provided at its end portion with a fitting portion, said fitting portion being detachably fitted to said portion to be fitted of said base body,
  wherein one of said portion to be fitted and said fitting portion is a recessed portion in the form of a recess, and the other one of said portion to be fitted or said fitting portion is a protruded portion in the form of protrusion so as to fit to said recessed portion, and wherein said protruded portion has a resiliently deformable leaf spring.

2. The base plate according to claim 1, wherein said recessed portion is formed in the widthwise direction or in the lengthwise direction of said base body, and said base body is provided on its bottom surface with a groove portion in the widthwise direction or in the lengthwise direction of said base body, said groove portion being in communication with said recessed portion.

3. The base plate according to claim 1, wherein a projection is formed on a surface of said protruded portion or said recessed portion.

4. The base plate according to claim 1, wherein said portion to be fitted is positioned on different side surfaces of said base body, respectively.

5. The base plate according to claim 1, wherein the height of a bottom surface of said fixing piece from said installation surface is higher by 0.1 to 1 mm than the height of a bottom surface of said base body from said installation surface.

6. The base plate according to claim 1, wherein said object is a piping member.

7. A base plate for fixing an object to be fixed onto an installation surface, comprising:
   a plate-like base body having a mounting portion on an upper surface thereof for mounting said object; and
   a fixing piece having bolt-fastened portions which are to be fastened onto said installation surface by means of fixing bolts, said fixing piece being detachably attached to a side surface of said base body,
      wherein said fixing piece includes a protruded portion extending from a side opposite to said bolt-fastened portions, said fixing piece being adapted to be attached to said base body by the protruded portion detachably engaging with a recessed portion formed on the side surface of said base body, and
      wherein the protruded portion of said fixing piece includes a resiliently deformable leaf spring and an insertion plate situated so as to be spaced apart from said leaf spring.

8. The base plate according to claim 7, wherein said leaf spring has a protrusion adapted to engage with the recessed portion of said base body.

9. A base plate for fixing a pipe member to be fixed onto an installation surface, comprising:
   a plate-like base body having a mounting portion on an upper surface thereof for mounting said pipe member, said base body being provided on a side surface thereof with a portion to be fitted along in a widthwise direction or in a lengthwise direction, said base body being provided on a bottom surface thereof with a groove portion extending along in the widthwise direction or in the lengthwise direction, said groove portion being in communication with said portion to be fitted; and
   a fixing piece having bolt-fastened portions which are to be fastened onto said installation surface by means of fixing bolts, said fixing piece being provided at an end portion thereof with a fitting portion which is detachably fitted to said portion to be fitted of said base body, said fixing piece being detachably attached to the side surface of said base body such that said bolt-fastened portions protrude from said base body,
   wherein said portion to be fitted is a recessed portion in the form of a recess,
   wherein said fitting portion is a protruded portion in the form of protrusion so as to fit to said recessed portion,
   wherein said protruded portion has a width slightly smaller than a width of the recessed portion, said protruded portion including an insertion plate which protrudes from said bolt-fastened portions in a horizontal direction, and a resiliently deformable leaf spring situated in a position lower than said insertion plate, said leaf spring being provided on a surface thereof with a protrusion adapted to engage with the groove portion of said base body.

* * * * *